(12) United States Patent
Tierling et al.

(10) Patent No.: US 8,325,144 B1
(45) Date of Patent: Dec. 4, 2012

(54) DIGITAL ENVELOPE MODULATOR FOR HAPTIC FEEDBACK DEVICES

(75) Inventors: Kollin M. Tierling, Milpitas, CA (US); Danny A. Grant, Montreal (CA); Daniel H. Gomez, Fremont, CA (US); Munibe M. Bakircioglu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 869 days.

(21) Appl. No.: 11/975,225

(22) Filed: Oct. 17, 2007

(51) Int. Cl.
*G06F 3/041* (2006.01)

(52) U.S. Cl. .................. 345/173; 345/156

(58) Field of Classification Search .......... 345/156, 345/173–179
See application file for complete search history.

(56) References Cited

U.S. PATENT DOCUMENTS

| | | | |
|---|---|---|---|
| 7,154,470 B2 | 12/2006 | Tierling | |
| 7,218,310 B2 | 5/2007 | Tierling et al. | |
| 7,639,232 B2 | 12/2009 | Grant et al. | |
| 2005/0017947 A1* | 1/2005 | Shahoian et al. | 345/156 |
| 2006/0129719 A1* | 6/2006 | Cruz-Hernandez et al. | 710/58 |
| 2007/0057916 A1 | 3/2007 | Tierling | |
| 2004/0285216 | 12/2007 | Tierling | |
| 2009/0243997 A1 | 10/2009 | Tierling et al. | |

OTHER PUBLICATIONS

International Preliminary Report on Patentability mailed Apr. 29, 2010 for corresponding PCT Application No. PCT/US08/78842.
Patent Cooperation Treaty, International Search Report, International Application No. PCT/US08/78842, mailed Dec. 5, 2008.
Supplemental European Search Report and Written Opinion mailed Feb. 18, 2011 for corresponding European Application No. 08838626.3.

* cited by examiner

*Primary Examiner* — Alexander Eisen
*Assistant Examiner* — Robin Mishler
(74) *Attorney, Agent, or Firm* — Kilpatrick Townsend & Stockton LLP

(57) ABSTRACT

A haptic feedback device includes a signal generation module configured to output a composite signal representable by a carrier signal and an envelope signal. The signal generation module includes a microcontroller capable of being programmed such that the carrier signal falls within a resonance frequency band of the haptic feedback device. The haptic feedback device also includes a user interface device, and a transducer configured to impart haptic force to the user interface device in response to the composite signal. A tactile mapping submodule, a duration mapping submodule, and an attack/decay mapping submodule may also be included. The tactile mapping submodule enables compensation for haptic output at different positions on the haptic feedback device, whereas the duration and attack/decay submodules enable prevention of unwanted audio output.

32 Claims, 9 Drawing Sheets

DIGITAL ENVELOPE MODULATOR FOR HAPTIC FEEDBACK DEVICES

BACKGROUND OF THE INVENTION

1. Field of the Invention

The present invention relates generally to the control of haptic feedback devices.

2. Description of the Related Art

Humans interface with electronic and mechanical devices in a variety of applications, and the need for a more natural, easy-to-use, and informative interface is a constant concern. One such application is interacting with computer-generated environments such as games, simulations, and application programs. Computer input devices such as mice and trackballs are often used to control a cursor within a graphical environment and provide input in these applications. In portable computer or electronic devices, such as laptop computers or personal digital assistants (PDAs), mice typically have too large a workspace to be practical. A popular device for portable computers are "touchpads," or touchscreens, which are small rectangular, planar pads that sense the location of a pointing object by any of a variety of sensing technologies.

In some interface devices, haptic feedback is also provided to the user. These types of interface devices can provide physical sensations which are felt by the user manipulating a user object (which may be referred to as a manipulandum) of the interface device. One or more motors or other type of actuators are coupled to the device housing or manipulandum and are connected to the controlling computer system. The computer system controls forces output by the actuators in coordination with displayed events. The computer system can thus convey physical force sensations to the user in conjunction with other supplied feedback as the user is grasping or contacting the interface device or manipulatable object or manipulandum.

In many haptic feedback devices, the haptic feedback takes the form of vibrations, jolts, or pulses output on the housing and/or manipulandum to be thus experienced by the user as tactile sensations providing additional feedback and enhancing the interaction experience. For example, many gamepad devices include a spinning eccentric mass that creates inertial vibrations on the gamepad or related objects. Other devices, such as the I-Feel Mouse from Logitech Corporation, provide inertial vibrations using a linearly-moving mass. Still other devices may vibrate a housing or object by impacting or directly moving the housing or object with the actuator, which may be for example a piezoelectric device or the like.

One problem with current haptic feedback devices is that tactile sensations output to the user tend to be more effective in particular frequency ranges and are less effective in other frequency ranges, thus causing haptic sensations to feel uneven and inconsistent to the user over broad frequency ranges, and requiring inconsistent amounts of drive power and input. The inconsistencies are functions of many variables, including the mechanics of the device being vibrated and the various components thereof, based in part on the interactions and arrangements of these components. Inherently, each such device has one or more resonance frequencies at which the device resonates, providing optimal response to induced actuation such as vibration at said resonance frequency or frequencies. The resonance frequency can change and depends on factors such as temperature and other physical parameters, component arrangement and interaction, and interaction by the user, which can vary in location and intensity and thereby impart commensurate variation in the resonance frequency of the device.

In related U.S. Pat. No. 7,154,470, whose FIG. 1 is reproduced herein, a desired haptic frequency is superimposed on the resonance frequency of the haptic device. In this manner, the desired haptic effect can be imparted to the device (and user) by using the resonance frequency as the optimum "vehicle" to convey this effect, since the device vibrates or resonates best at this resonance frequency and the most efficient response by the device can thus be achieved. In FIG. 1, a modulation circuit 10 includes a reference oscillator 11 serving to provide the reference signal (at or near resonance) to an envelope modulator 12. A microcontroller 14 is coupled to the envelope modulator 12, providing an envelope signal 13 thereto, thereby enabling the envelope modulator to modulate the reference signal from reference oscillator 11 based on the envelope signal. The output of the envelope modulator 12, having the form of a modulated command signal 16, is then passed through a low pass filter 15, whose output is provided to an inverter 17 and, in the from of an envelope modulated signals 18, to a transducer/amplifier 19. The transducer/amplifier 19 relies for instance on pulse-width modulation (PWM) techniques and is coupled to a portion (not shown) of a user interface device, such as a housing of a touchpad or a joystick or similar device as described above, operating to impart haptic forces to said portion for providing tactile feedback based on the signal processed by the modulation circuit 10.

While the modulation circuit of FIG. 1 provides adequate control of a haptic force signal and can be readily tuned to a resonant frequency of the device, in some cases more versatility may be desired, for instance when the resonant frequency is changeable due to one or more of the factors discussed above, including variations in user interaction, in ambient temperature, and so on. In addition, it may be desirable to manage the excitation signal provided to the haptic device so as to remove spurious or unwanted components thereof, such as those that may produce unwanted audible effects. On the other hand, in some instances the opposite may be desired—that is, the provision of both audible and haptic feedback may be intended. In either case, the ability to tailor the excitation signal driving the actuator to achieve the desired response—haptic only, or haptic-plus-audio (or even audio only)—would provide a valuable advantage. Further, the elimination of some of the components of the modulation circuit can yield size and cost savings.

SUMMARY

As disclosed herein, a haptic feedback device includes a signal generation module configured to output a composite signal representable by a carrier signal and an envelope signal, with the signal generation module including a microcontroller capable of being programmed such that the carrier signal falls within a resonance frequency band of the haptic feedback device. The haptic feedback device also includes a user interface device, and a transducer configured to impart haptic force to the user interface device in response to the composite signal.

Also disclosed herein is a haptic feedback device comprising a signal generation module configured to provide an output signal, a tactile mapping submodule configured to adjust a component of the output signal as a function of a location on the haptic device at which haptic force is output by the haptic feedback device, a user interface device, and a transducer configured to impart haptic force to the user interface device in response to the output signal.

Also disclosed herein is a haptic feedback device comprising a signal generation module configured to generate an output signal, a duration mapping submodule configured to modify the output signal, a user interface device, and a transducer configured to impart haptic force to the user interface device for a duration beginning and/or ending substantially at a zero crossing point of the modified output signal.

Also disclosed herein is a haptic feedback device comprising a signal generation module configured to generate an output signal, an attack/decay submodule configured to modify the output signal to thereby substantially eliminate discontinuities at at least one zero crossing points thereof, a user interface device, and a transducer configured to impart haptic force to the user interface device in response to the modified output signal, the haptic force beginning and/or ending at said at least one zero crossing point.

Also disclosed herein is a method for generating haptic feedback using a haptic feedback device. The method includes generating a composite signal representable by a carrier signal and an envelope signal, generating haptic force by the haptic feedback device at a resonance frequency of the haptic feedback device, and modifying the composite signal in response to a change in the resonance frequency.

Also disclosed herein is a method for generating haptic feedback using a haptic feedback device. The method includes generating an output signal, and adjusting a component of the output signal as a function of a location on the haptic device at which haptic force is output by the haptic feedback device.

Also disclosed herein is a method for generating haptic feedback using a haptic feedback device. The method includes generating an output signal, modifying the output signal, and imparting haptic force to the user interface device for a duration beginning and/or ending substantially at a zero crossing point of the modified output signal.

Also disclosed herein is a method for generating haptic feedback using a haptic feedback device. The method includes generating an output signal, modifying the output signal to thereby substantially eliminate discontinuities at at least one zero crossing points thereof, and imparting haptic force to the user interface device in response to the modified output signal, the haptic force beginning and/or ending at said at least one zero crossing point.

DETAILED DESCRIPTION OF AN EXAMPLE EMBODIMENT

Figure 1:
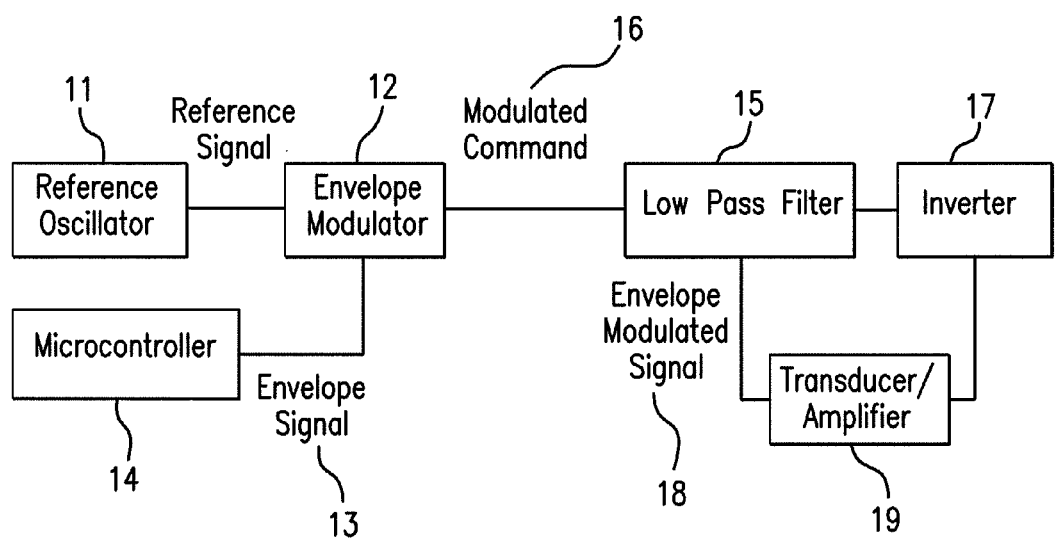
FIG. 1 is a block diagram of a prior art circuit for generating an output signal comprised of superimposed carrier and an envelope signals.
Figure 1:
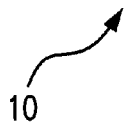

The description herein is provided in the context of a digital envelope modulator for a haptic feedback device. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), comprising field programmable gate arrays (FPGAs) and complex programmable logic devices (CPLDs), application specific integrated circuits (ASICs), or the like, may also be used without departing from the scope and spirit of the inventive concepts disclosed herein.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N. Mex. The method may also be implemented on a multiple-processor system, or in a computing environment comprising various peripherals such as input devices, output devices, displays, pointing devices, memories, storage devices, media interfaces for transferring data to and from the processor(s), and the like. In addition, such a computer system or computing environment may be networked locally, or over the Internet.

Figure 2:
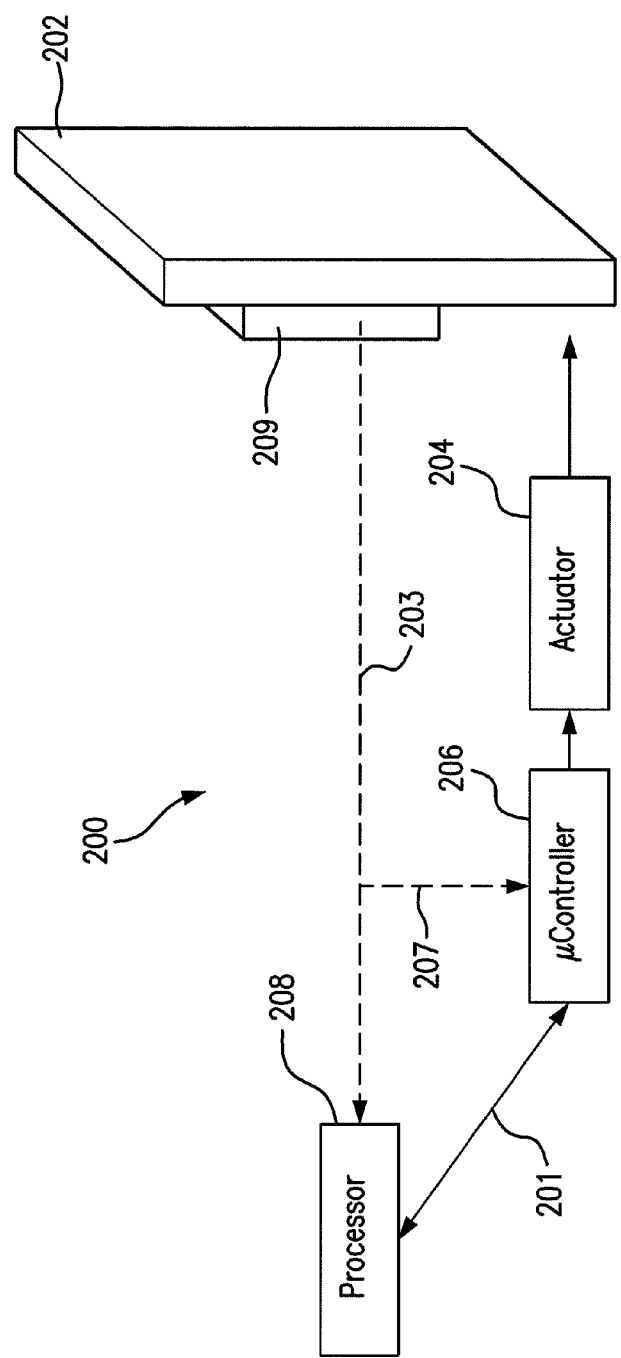
FIG. 2 is a block diagram of a haptic feedback system.

FIG. 2 is a block diagram showing the basic architecture of a haptic feedback system 200. A user interface device 202 delivers the haptic feedback to a user during interactions between the device and the user. Device 202 may or may not also serve to receive inputs from the user. A device that receives inputs from the user can be for example a type of computer mouse, joystick, control knob, a remote control such as for a television set and the like, a key pad, a touch pad, or a touch screen. A touch screen is a specific instance of a touch pad, configured to display one or more graphical objects, such as words and hyperlinks, icons, cursors, push-button representations, sliders for document scrolling and the like, and so on, and to allow manipulation of these graphical objects based on user interaction parameters such as interaction location, interaction duration, extent of pressure exertion by the finger of the user or a stylus or other object, and so on. The device 202 may be a component of a larger device (not shown). For instance, it may be the touchpad of a laptop or PDA (personal digital assistant), the button or keypad of a mobile telephone or pager, the control knob of a radio or control panel in an automobile or other vehicle dashboard, and so on.

An actuator 204 is mechanically coupled to user interface device 202. Actuator 204, when properly excited by an excitation signal, imparts haptic forces to user interface device 202. The details of the mechanical coupling between the actuator 204 and device 202 are generally well known and are omitted herein for brevity. It should be noted however that the coupling may include direct and indirect coupling mechanisms, and may be by way of compliant or similar suspensions intended to suitably amplify, isolate, or otherwise provide a measure of control to the mechanical motions imparted to the interface device 202, or to selective portions thereof. There are many types of actuators that can be used, including piezo-electric actuators, voice coil actuators, pager motor actuators, solenoids, moving linear masses, and so on. The motion imparted to the device 202 can cause motion of the housing of the device, and/or motion of other components of the device 202, which motion is sensed by the user through the user's direct or indirect contact with the component of the device. For instance, in the case of a touchpad, either the housing of the touchpad or the surface that is contacted by the user's finger or stylus, or portions of the housing and/or touchpad, can be induced to vibrate. The motion imparted to the device 202 can be along any one or a plurality of directions. In the case of the touchpad again, the motion can be substantially perpendicular to the touch surface, or it can be substantially in the same or a parallel plane. Further, while discussed herein in terms of vibration, it will be appreciated that imparted motion is not so limited and other motions such as impulse motions (jolts and the like) are contemplated. The motion can also be a combination of vibration and other motions, providing the user with various sensations such as that of jolt and/or a texture which can be associated with different portions of the device with which the user is interfacing, and so on.

Actuator 204 is actuated by excitation signals from a local microcontroller 206 in response to high-level commands that the microcontroller receives from a host device or processor 208. The host device or processor 208 can be provided in a separate housing from that containing the other components of haptic feedback system 200, in which case a cable (not shown) or a wireless connection can be used to provide the communication link between host processor 208 and microcontroller 206. Such a link can be bi-directional (indicated by the double-headed arrow 201), with the processor 208 receiving status signals from microcontroller 206 or even directly from interface device 202 (broken arrow 203, also showing in branch 207 status signals received by microcontroller 206 from interface device 202), the status signals for example representing input cues from the user, or locations or durations of such inputs, and so on, which a suitable sensing mechanism 209, for example of the capacitive or resistive type for sensing contact with the user's finger or stylus in the case of a touch pad, is equipped to detect and to convey back to the microcontroller 206 and/or host processor 208. The status signals can be communicated to the processor 208 through the bi-directional link 201 and may be used by the processor 208, in conjunction with any of a variety of software programs it may be running, as a basis for its high level command signals to the microcontroller 206. The software programs run by the processor 208 may for example be a word processor, spreadsheet, video or computer game, drawing program, operating system, graphical user interface, simulation, Web page or browser that implements HTML or VRML instructions, scientific analysis program, virtual reality training program or application, and so forth. Further, in accordance with one embodiment, the host processor 208 can be eliminated altogether, and the functions attributed thereto in the discussion above can instead be performed exclusively by the microcontroller 206. The opposite may also hold true, with the host processor 208 serving to provide the exclusive source of control.

The high-level command signals from host processor 208 to microcontroller 206 can be force commands that include for example the type of haptic sensation desired and, optionally, the parameters associated with such sensations, such as vibration frequency, amplitude, duration, and so on. Microcontroller 206 then uses these high-level commands to provide excitation signals to actuator 204, causing the actuator to actuate the interface device 202 (or portions thereof) for the prescribed duration, frequency, and so on.

As explained above, a haptic feedback system such as system 200 has one or more resonance frequencies inherent to its particular configuration and componentry. At the resonance frequency, the system responds more effectively to actuations by actuator 204, and it is advantageous to exploit this resonance frequency to achieve the desired haptic effect. Thus the desired haptic signal is constructed based on the superimposition of a modulating or envelope frequency over the resonance frequency, used as a carrier. However, the inevitable variability of the inherent resonance frequency, for example due to temperature changes, manufacturing tolerances, and changes in user input as explained above, should be accommodated. Similarly, if multiple resonance frequencies exist for the system, as is possible, it may be advantageous to switch between one or the other resonance frequency depending on the particular situation.

Figure 3:
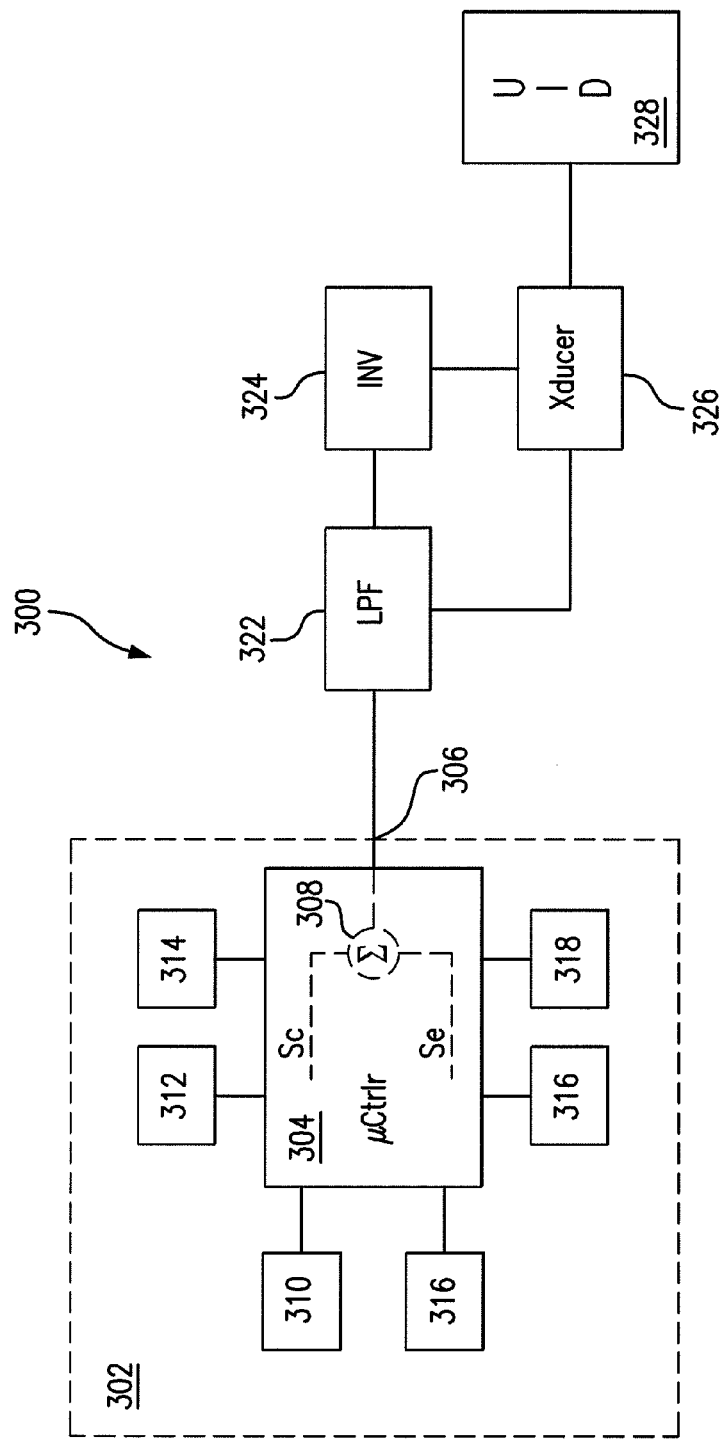
FIG. 3 is a block diagram of a showing some details of a haptic feedback system.

Such versatility can be realized using digital-based system 300 shown in block diagram in FIG. 3. System 300 includes a signal generation module 302 having a microcontroller 304. For ease of explanation, signal generation module 302 is illustrated as consisting of several submodules each having one or more associated functions. It will be appreciated, however, that such a description is primarily for convenience, and the enumerated functions of the various modules and submodules described herein may overlap, and some modules and/or submodules may be dispensed with altogether, along with some of their functions; or some of these functions can be migrated to other modules and submodules. Further, the terms "module" and "submodule" are to be understood to each refer to either a hardware component, a software (also firmware) component, or a combination of hardware and software (firmware) components, without limitation.

Microcontroller 304 is programmed to generate an output signal which can be in the form of a composite signal 306 consisting of a carrier signal that is modulated by an envelope signal. For ease of explanation, these signals, shown separately and designated $S_c$ and $S_e$, respectively, are shown to be combined together by a combiner 308. The use of broken lines is to emphasize the illustrative nature of this depiction, as it is to be understood that the output of the microcontroller 304 is the single composite signal 306 in this example. Microcontroller 304 is programmable such that the carrier signal $S_c$ can be adapted or changed depending on the particular circumstances. Thus if there is drift in the resonance frequency of the overall system, due for example to ambient temperature changes, humidity changes, or changes in the manner that the user is holding the device or is issuing inputs thereto, the carrier signal frequency can be changed by microcontroller 304 commensurately in order to continue to exploit the advantages of excitation of the device at its resonance frequency. This is particularly advantageous because the resonance frequency is often over a narrow frequency band and any deviation therefrom could fall out of the resonance band and lose the associated advantages. Further, because the resonance frequency is typically over such a narrow frequency band, fine control of the carrier signal is desired in order to accurately target that narrow frequency band and maintain a lock therein throughout operation. In addition, in some devices, multiple resonance frequencies may be present, and it may be advantageous to switch from one resonance frequency band to the other, and to do so accurately, optionally in real time, and to maintain a lock in each of these frequency bands during operation as desired. These benefits can be readily realized if the carrier signal is generated at least partially in software by signal generation module 302, as is presently contemplated, rather than being hard-wired and fixed in the system or substantially fixed by less wieldy hardware components.

A wave table submodule 310 in signal generation module 302 contains a set of component waves, or parameters descriptive of such component waves, for use by the microcontroller 304 in constructing the resonance frequency carrier signal. The submodule 310 may for example be any electronic storage component, preferably persistent, such as ROM or flash memory or the like. Microcontroller 304 calls on this table as a starting point for construction of carrier signal $S_c$ at the resonance frequency or frequencies of the device, depending on the particular circumstance.

An envelope signal submodule 312 is also accessed by the microcontroller 304, enabling the microcontroller to construct a modulation signal in conformance with the high-level commands dictating the overall haptic effect desired. As mentioned above, the high-level commands can issue from either the signal generation module 302 (for example from the microcontroller 304) or from a host or other processor (FIG. 2) in communication with the signal generation module 302. The high-level commands, which may be functions of or responsive to signals from a detector such as sensing mechanism 209 (FIG. 2) or the like, define features of the haptic force that is to be output to the user, such as the nature of the sensation desired, including for example whether it is a bump, jolt, discontinuity, a combination of such sensations, and so on, and also including its duration, intensity (amplitude), its vibrational frequency (or frequencies in the case of multiple vibrational forces), and so on. Parameters relating to these features can be stored in the envelope signal submodule 312. Some or all features or descriptors of the haptic force to be generated can also be obtained from an effect library submodule 314 provided for this purpose.

Another input parameter that may be used to control or influence the envelope-modulated composite signal 306 is the position of the interaction between the haptic device and the user, as briefly noted above. For instance, in the case of a touchpad, the user may interact (through touch or a stylus, for instance) with any one of four corners of the (optionally rectangular) touch pad, with an edge of the touch pad, or with a central region of the touch pad. The location of the interaction is known from signals provided by a detector such as sensing mechanism 209 (FIG. 2) or the like. Because of mechanical and other constraints, the same excitation signals provided to the actuator will result in different haptic effects and/or different haptic sensations imparted to the user. Specifically, the user may feel a different haptic force when he/she touches one corner versus another corner of the device, or the central region versus a corner, or an edge versus the central region, even though the same haptic force is being imparted by the actuator. This may for example be due to the fact that the surface of the touch pad with which the user is interacting may be anchored more rigidly on one side versus another, as dictated by limitations such as mechanical or manufacturing tolerances and so on, or because, in the case of multiple actuators, the forces delivered by the actuators are not exactly matched due again to mechanical or manufacturing tolerances and the like. In addition, the interaction between the user and the device may itself impart mechanical changes and variation, such as damping, as it inevitably disrupts, to some degree, the mechanical equilibrium of the device, even though this disruption may at times be imperceptible.

Signal generation module 302 can be programmed to compensate for these user- or tolerance-induced variations, or the like, by intensifying the actuation when a weaker response region of the device is being contacted, and by reducing the intensity of the actuation when a stronger response region of the device is being contacted. This compensation, referred to as tactile mapping, provides a uniform response profile for the device for any given haptic effect, reducing the impact of mechanical limitations of the system and of disruptive user impact, and is advantageous regardless of the location or nature of the mechanical coupling of the actuator to the other components of the device, and regardless of the number of actuators, which may exceed one, and any mismatch between such multiple actuators. Compensation can be provided by a tactile mapping submodule 316, which maps the location of the user interaction against one or more characteristics of the desired haptic effect, such as it intensity. Referring to the tactile mapping submodule 316, the microcontroller 304 is able to weight the generated composite signal 306 accordingly, for example decreasing or increasing its amplitude and/or frequency depending on the location at which the haptic feedback is to be provided. The tactile mapping submodule 316 can thus serve to adjust the composite signal, by way of an adjustment of the envelope signal $S_e$ and/or the carrier signal $S_c$, as a function of a location on the haptic device at which haptic force is output to the user. As an example, when a particular haptic effect is to be provided at a weaker response region of the device, the envelope signal $S_e$ may be weighted more heavily in order to compensate for the weaker response, while when the particular haptic effect is to be provided at a stronger response region of the device, the envelope signal $S_e$ may be weighted less heavily in order to take into account the stronger response. It is also possible that the weighting may be applied to the carrier signal $S_c$ in lieu of, or in conjunction with, weighting of the envelope signal $S_e$. Further, while "weighting" typically conjures amplitude manipulation, it is to be understood that this term is equally applicable to alterations of other characteristics of the haptic forces imparted to the device, including changes to their duration, frequency, or any of the other myriad parameters used to define and control the nature of these forces. Weighting and control may also be functions of feedback obtained from sensing mechanism 209 (FIG. 2), or from a sensing mechanism (not shown) designed to output a signal indicative of the resonance frequency and whether or not the output is in the resonance band of the device.

Figure 4:
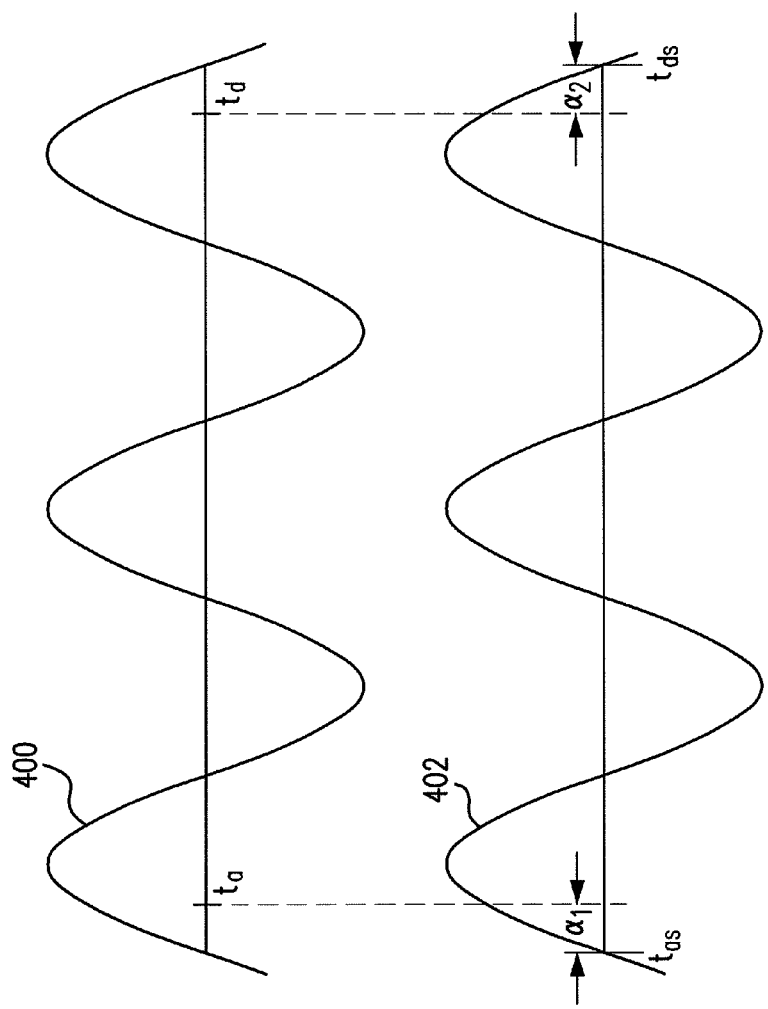
FIG. 4 is a graphical representation of signals illustrating aspects of duration mapping.

Another component which may optionally be included in a digital-based system such as system 300 is duration mapping submodule 318, responsible for reducing audible effects that may accompany device stimulation. In particular, induced vibrations can generate audible compression waves, in the manner of loudspeakers inducing compression waves in air. In most—albeit not all—circumstances, accompaniment of the haptic effect by audible effects is undesirable, and elimination measures can be taken. Since the audible effects occur at sudden applications or discontinuities in the forces generated by the actuator, duration mapping submodule 318 is provided in order extend or contract the duration of the composite signals upon which the application of these forces is based so as to ensure that an excitation signal provided to the actuator based on the composite signal 306 begins and/or ends at a zero-amplitude crossing point of an oscillation cycle. In this manner the waveform applied to the actuator is made to begin and end at zero volts, eliminating discontinuities that would otherwise result from sudden application or termination of actuator-induced force, and thus suppressing audible noise. As seen in FIG. 4, for an applied sine wave, this occurs at multiples of pi ($\pi$), or the half-period. Curve 400 has attack $t_a$ and decay $t_d$ times that are non-coincident with the zero crossings of the curve. When the signal corresponding to curve 400 is applied to an actuator at attack point $t_a$, and decoupled from the actuator at decay point $t_d$, audible effects are induced. By comparison, curve 402 has attack $t_{as}$ and decay $t_{ds}$ points that are shifted, by times $\alpha_1$ and $\alpha_2$, so as to achieve the desired zero-crossings. While in the example of FIG. 4 this shifting reduces the duration of the excitation signal as it is applied to the actuator, and in other examples the net effect may be an extension of the duration, the attendant reduction in audible effects may nonetheless justify its application. It will be appreciated that information from duration mapping submodule 318 can be used to manipulate the carrier signal $S_c$, the envelope signal $S_e$, or the combined, composite signal 306, depending on the particular application. Any of these signals can thus be suitably manipulated in order to ensure that the operation of the actuator begins and/or ends at the zero-amplitude crossing point of the excitation signal the actuator receives. Further, signal manipulation to alter the attack or delay points can also be effected further downstream from the signal generation module 302, and not necessarily with the composite signal 306 per se, with the result that the actuator force does not begin or end abruptly. In addition, in some limited circumstances, the frequency of the excitation can be increased or decreased to achieve the desired zero-crossings, in addition to or in lieu of alteration of the attack and/or decay points. This frequency alteration may of course be subject to the resonance frequency band constraints, which may be too narrow to permit such alteration without falling out of band. In the case of frequency alteration, the mapping would not be strictly "duration" mapping in the narrow, temporal sense of that term, but the term remains relevant in the broader sense inasmuch frequency is related, inversely, to time. It is the broader definition of the term that is used herein.

Figure 5:
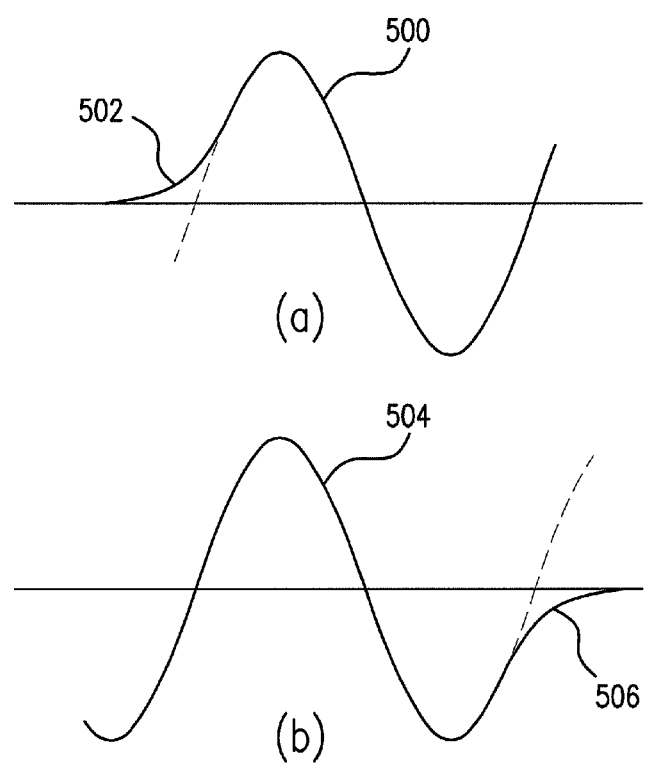
FIG. 5 is a graphical representation of signals illustrating aspects of attack/decay mapping.

A similar approach to duration mapping, also primarily for the elimination of audible effects, is attack/decay mapping. For this purpose, an attack/delay submodule 320 is provided, as seen in FIG. 3. Since, as mentioned above, audible effects have been found to occur at sudden applications or discontinuations of the actuator force, it may be advantageous to "smooth out" the excitation signal to the actuator at its attack or decay points. With reference to FIGS. 5(a) and 5(b), the smoothing out at the attack portion of the signal 500 is depicted by the portion of 502 of the curve, whereas the smoothing out at the decay portion of curve 504 is depicted by the curve portion 506. Smoothing out can be governed by suitable functions implemented in software or hardware, and/or with reference to lookup tables, for example.

Returning to system 300 of FIG. 3, after the composite signal 306 is generated by signal generation module 302, it is applied to a lowpass filter 322, whose output is applied to an inverter 324 and to a transducer/amplifier 326. It should be understood that the term "transducer" is the general term for an actuator as described above, and can be for example any of the aforementioned piezo-electric devices, voice coil actuators, pager motor actuators, solenoids, moving linear masses, et cetera. Excitation of the transducer/amplifier 326 in this manner results in haptic forces imparted to a user interface device 328, and/or the haptic feedback device in general, to which the transducer/amplifier 326 is mechanically coupled, either directly or indirectly. The excitation is, as described herein, based on the composite signal 306 issued from the signal generation module 302, and more specifically, from the microcontroller 304 thereof. It will be appreciated that the composite signal itself may either be provided directly, or indirectly by way of other processing, to the actuator/transducer as an excitation signal, so long as the excitation signal that causes actuation of the actuator, and commensurate haptic force and feedback, is based on the output from the signal generation module as this output is generated in the manner described above. Further, the output may or may not be describable as a composite signal of a carrier signal and an envelope signal, depending on the circumstances. In addition, it will be appreciated that the inverter 324 is optional and is used in accordance PWM (Pulse Width Modulation) techniques known in the art for providing excitation signals to an actuator such as that of transducer/amplifier 326. Other techniques for exciting the transducer and generating haptic forces therefrom based on the signals from the transducer are also contemplated.

Figure 6:
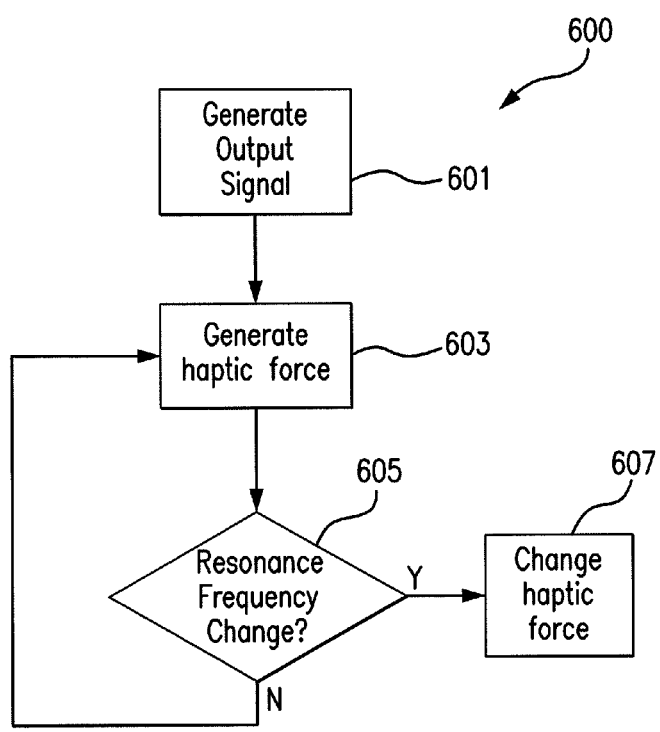
FIG. 6 is a flow diagram of a first process for generating haptic feedback that takes into account the resonance frequency of a haptic feedback device.

FIG. 6 is a flow diagram of a first process for generating haptic feedback that takes into account the resonance frequency of a haptic feedback device. At Step 601, an output signal is generated, for example using the signal generation module 302 shown in FIG. 3. At Step 603, a haptic force based on the output signal is generated, the haptic force being at a resonance frequency of the haptic device. At Step 605, it is determined whether the resonance frequency has changed. If so, then at Step 607, the output signal is modified so that the haptic force remains within the resonance frequency. If the resonance frequency has not changed, then the output signal remains unchanged, at Step 609.

Figure 7:
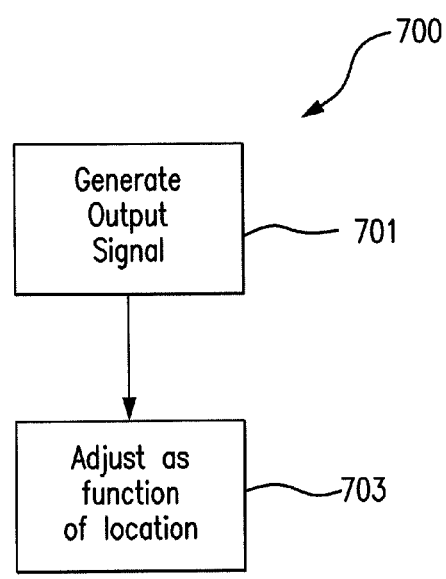
FIG. 7 is a flow diagram of a process for generating a haptic feedback using tactile mapping.

FIG. 7 is a flow diagram of a process for generating a haptic feedback which is location dependent—that is, that uses tactile mapping as described above. At Step 701, an output signal is generated. Then, at Step 603, a component of the output signal is adjusted as a function of a location of the haptic force to be output. This location is determined based on processing by the signal generation module 302 (FIG. 3).

Figure 8:
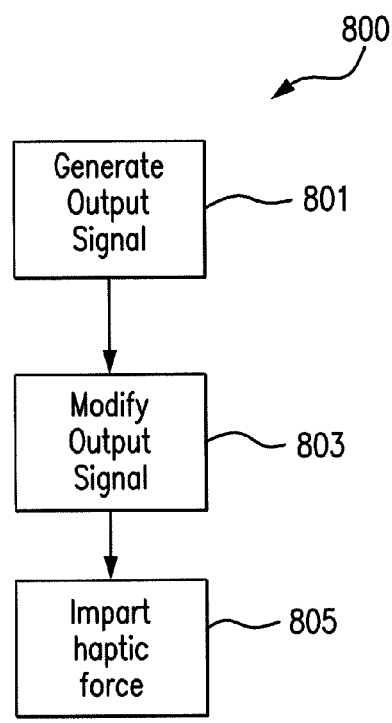
FIG. 8 is a flow diagram of a process in which duration mapping is used.

FIG. 8 is a flow diagram of a process in which duration mapping is used to avoid audible effects. At Step 801, an output signal is generated, for example using the signal generation module 302 shown in FIG. 3. At Step 803, the output signal is modified, for example changing its attack point, its delay point, or its frequency, as described above. Then, at Step 805, haptic force is imparted for a duration that begins and/or ends substantially at a zero crossing point of the modified output signal.

Figure 9:
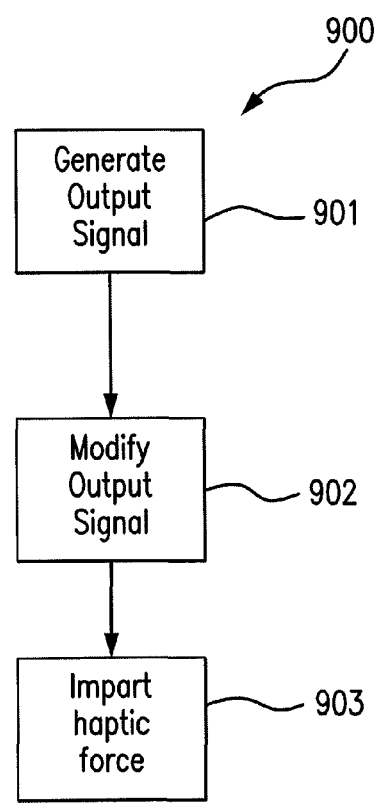
FIG. 9 is a flow diagram of a process in which attack/decay mapping is used.

FIG. 9 is a flow diagram of a process in which attack/decay mapping is used to avoid audible effects. At Step 901, an output signal is generated, for example using the signal generation module 302 shown in FIG. 3. At Step 903, the output signal is modified to substantially eliminate discontinuities at at least one zero crossing point thereof. At Step 905, haptic force is imparted in response to the modified output signal, the haptic force beginning and/or ending at said at least one zero crossing point.

The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. A haptic feedback device comprising:
a user interface device;
a transducer coupled to the user interface device and configured to impart a haptic force to the user interface device at a resonance frequency of the haptic feedback device based on an output signal;
a sensor configured to output a sensor signal; and
a signal generation module comprising a programmable microcontroller, the signal generation module configured to determine the resonance frequency based on the sensor signal and to provide the output signal, wherein the output signal is a composite signal comprising a carrier component and an envelope component, and wherein the microcontroller is programmable to control at least one of the carrier component or the envelope component to change the haptic force based on the sensor signal and a change to the resonance frequency caused by an external force.

2. The haptic feedback device of claim 1, wherein the signal generation module further comprises a wave table submodule configured to store a set of component waves.

3. The haptic feedback device of claim 1, wherein the signal generation module further comprises an envelope component submodule configured to be used by the microcontroller to construct the envelope component.

4. The haptic feedback device of claim 1, wherein the signal generation module further comprises an effect library submodule configured to store haptic effect descriptors from which the output signal is constructed.

5. The haptic feedback device of claim 1, wherein the signal generation module further comprises a tactile mapping submodule configured to adjust at least one of the carrier component or the envelope component based at least in part on a location on the haptic feedback device at which haptic force is output.

6. The haptic feedback device of claim 1, wherein the signal generation module further comprises a duration mapping submodule configured to modify the output signal such that haptic force is output for a duration beginning and/or ending substantially at a zero crossing point of the output signal.

7. The haptic feedback device of claim 1, wherein the signal generation module further comprises an attack/decay submodule configured to modify the output signal to thereby substantially eliminate discontinuities at at least one zero crossing point thereof, the haptic force beginning and/or ending at the at least one zero crossing point.

8. A method for generating haptic feedback using a haptic feedback device, the method comprising:
generating an output signal;
generating haptic force based on the output signal at a resonance frequency of the haptic feedback device;
receiving a sensor signal;
determining the resonance frequency based on the sensor signal; and
modifying the output signal in response to the sensor signal and a change in the resonance frequency caused by an external force.

9. The method of claim 8, wherein said change comprises a switch from a first resonance frequency to a second resonance frequency.

10. The method of claim 9, wherein the output signal is a composite signal comprising a carrier component and an envelope component, and modifying the output signal comprises controlling at least one of the carrier component or the envelope component to change the haptic force based on changes to the resonance frequency.

11. The method of claim 10, wherein generating an output signal comprises retrieving one or more component waves from a wave table submodule configured to store a set of component waves.

12. The method of claim 10, wherein generating an output signal comprises retrieving one or more envelope components from an envelope component submodule configured to store a set of component envelope waves.

13. The method of claim 10, wherein generating an output signal comprises retrieving one or more haptic effect descriptors.

14. A haptic feedback device comprising:
a user interface device;
a transducer coupled to the user interface device and configured to impart a haptic force to the user interface device, based on an output signal, such that the user interface device outputs haptic feedback at a targeted location;
a sensor configured to output a sensor signal; and
a signal generation module comprising a programmable microcontroller and a tactile mapping submodule, the signal generation module configured to determine the resonance frequency based on the sensor signal and to generate the output signal with reference to the tactile mapping submodule such that the output signal is based in part on the targeted location, and wherein the output signal is a composite signal comprising a carrier component and an envelope component, and wherein the microcontroller is programmable to control at least one of the carrier component or the envelope component to change the haptic force based on the sensor signal and a change to a resonance frequency of the haptic feedback device caused by an external force.

15. A haptic feedback device comprising:
a user interface device;
a sensor configured to output a sensor signal;
a signal generation module configured to determine the resonance frequency based on the sensor signal and to provide an output signal, wherein the output signal is a composite signal comprising a carrier component and an envelope component, and wherein the microcontroller is programmable to control at least one of the carrier component or the envelope component to change the haptic force based on the sensor signal and a change to the resonance frequency caused by an external force;

a tactile mapping submodule configured to adjust the output signal based in part on a location on the user interface device at which a haptic force is to be output; and a transducer configured to receive an adjusted output signal and impart the haptic force to the user interface device in response to the adjusted output signal.

16. The haptic feedback device of claim 15, wherein the signal generation module further comprises a wave table submodule configured to store a set of component waves.

17. The haptic feedback device of claim 15, wherein the signal generation module further comprises an envelope signal submodule controlled by the microcontroller and configured to construct the envelope signal.

18. The haptic feedback device of claim 15, wherein the signal generation module further comprises an effect library submodule configured to store haptic effect descriptors.

19. A method for generating haptic feedback using a haptic feedback device, the method comprising:

generating an output signal, wherein the output signal is a composite signal comprising a carrier component and an envelope component;

adjusting at least one of the carrier component or the envelope component of the output signal based in part on a location on the haptic feedback device to output haptic force;

receiving a sensor signal;

determining the resonance frequency based on the sensor signal; and adjusting at least one of the carrier component or the envelope component to change the haptic force based on the sensor signal and a change to a resonance frequency of the haptic feedback device caused by an external force.

20. A haptic feedback device comprising:

a user interface device;

a transducer configured to impart haptic force to the user interface device based in part on an output signal, the transducer configured to output the haptic force for a duration beginning and/or ending substantially at a zero crossing point of the output signal;

a sensor configured to output a sensor signal; and a signal generation module comprising a duration mapping submodule and a microcontroller, the signal generation module configured to determine the resonance frequency based on the sensor signal and to generate the output signal based in part on the duration mapping submodule, wherein the output signal is a composite signal comprising a carrier component and an envelope component, and wherein the microcontroller is programmable to control at least one of the carrier component or the envelope component to change the haptic force based on the sensor signal and a change to a resonance frequency of the haptic feedback device caused by an external force.

21. The haptic feedback device of claim 20, wherein the duration mapping submodule controls the duration of the output signal.

22. The haptic feedback device of claim 20, wherein the duration mapping submodule controls the frequency of the output signal.

23. The haptic feedback device of claim 20, wherein the signal generation module further comprises a wave table submodule configured to store a set of component waves.

24. The haptic feedback device of claim 20, wherein the signal generation module further comprises an envelope signal submodule controlled by the microcontroller and configured to generate the envelope signal.

25. The haptic feedback device of claim 20, wherein the signal generation module further comprises an effect library submodule configured to store haptic effect descriptors.

26. A method for generating haptic feedback using a haptic feedback device, the method comprising:

generating an output signal wherein the output signal is a composite signal comprising a carrier component and an envelope component;

imparting a haptic force on the haptic feedback device for a duration beginning and/or ending substantially at a zero crossing point of the output signal;

receiving a sensor signal;

determining the resonance frequency based on the sensor signal; and modifying at least one of the carrier component or the envelope component to change the haptic force based on the sensor signal and a change to the resonance frequency of the haptic feedback device caused by an external force.

27. The method of claim 26, wherein the modifying includes changing a frequency of the output signal.

28. A haptic feedback device comprising:

a user interface device;

a sensor configured to output a sensor;

a signal generation module comprising a microcontroller, the signal generation module configured to determine the resonance frequency based on the sensor signal and to generate an output signal wherein the output signal is a composite signal comprising a carrier component and an envelope component and wherein the microcontroller is programmable to control at least one of the carrier component or the envelope component to change the haptic force based on the sensor signal and a change to a resonance frequency caused by an external force;

an attack/decay mapping submodule configured to modify at least one of the carrier component or the envelope component to substantially eliminate discontinuities at at least one zero crossing point of the output signal;

a transducer configured to impart haptic force to the user interface device in response to the output signal, the haptic force beginning and/or ending at the at least one zero crossing point.

29. The haptic feedback device of claim 28, wherein the signal generation module further comprises a wave table submodule configured to store a set of component waves.

30. The haptic feedback device of claim 28, wherein the signal generation module further comprises an envelope signal submodule controlled by the microcontroller and configured to construct the envelope signal.

31. The haptic feedback device of claim 28, wherein the signal generation module further comprises an effect library submodule configured to store haptic effect descriptors.

32. A method for generating haptic feedback using a haptic feedback device, the method comprising:

generating an output signal, wherein the output signal is a composite signal comprising a carrier component and an envelope component;

imparting a haptic force on the haptic feedback device in response to the output signal, the haptic force beginning and/or ending at at least one zero crossing point of the output signal;

modifying at least one of the carrier component or the envelope component to substantially eliminate discontinuities at at least one zero crossing point of the output signal;
receiving a sensor signal;
determining the resonance frequency based on the sensor signal; and modifying at least one of the carrier component or the envelope component to change the haptic force based on the sensor signal and a change to the resonance frequency caused by an external force.

\* \* \* \* \*